(12) United States Patent
Kakimoto

(10) Patent No.: US 11,007,966 B2
(45) Date of Patent: May 18, 2021

(54) HEAD PROTECTING AIRBAG DEVICE

(71) Applicant: TOYODA GOSEI CO., LTD., Kiyosu (JP)

(72) Inventor: Kenji Kakimoto, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 91 days.

(21) Appl. No.: 16/442,053

(22) Filed: Jun. 14, 2019

(65) Prior Publication Data

US 2019/0389418 A1    Dec. 26, 2019

(30) Foreign Application Priority Data

Jun. 25, 2018 (JP) .............................. JP2018-120184

(51) Int. Cl.
| | | |
|---|---|---|
| *B60R 21/232* | (2011.01) | |
| *B60R 21/231* | (2011.01) | |
| *B60R 21/214* | (2011.01) | |
| *B60R 21/215* | (2011.01) | |

(52) U.S. Cl.
CPC .......... *B60R 21/232* (2013.01); *B60R 21/214* (2013.01); *B60R 21/215* (2013.01); *B60R 21/23138* (2013.01)

(58) Field of Classification Search
CPC .... B60R 21/214; B60R 21/232; B60R 21/213
See application file for complete search history.

(56) References Cited

U.S. PATENT DOCUMENTS

| | | | | |
|---|---|---|---|---|
| 7,172,209 B2* | 2/2007 | Totani | ................... | B60R 21/213 |
| | | | | 280/728.2 |
| 9,487,175 B2* | 11/2016 | Noma | ................... | B60R 21/237 |
| 9,994,186 B2* | 6/2018 | Fukawatase | ...... | B60R 21/23138 |
| 10,513,237 B2* | 12/2019 | Sato | ..................... | B60R 21/213 |
| 2005/0046160 A1* | 3/2005 | Totani | ................... | B60R 21/213 |
| | | | | 280/730.2 |
| 2016/0288760 A1* | 10/2016 | Jinnai | ................... | B60R 21/201 |

FOREIGN PATENT DOCUMENTS

| | | | | | |
|---|---|---|---|---|---|
| EP | 1491411 A1 | * | 12/2004 | .......... | B60R 21/232 |
| EP | 1674349 A1 | * | 6/2006 | .......... | B60R 21/213 |
| JP | 2005053366 A | * | 3/2005 | .......... | B60R 21/215 |
| JP | 2005075321 A | * | 3/2005 | .............. | B60N 2/58 |
| JP | 2005096697 A | * | 4/2005 | | |
| JP | 4033053 B2 | * | 1/2008 | | |
| JP | 2011136638 A | * | 7/2011 | | |
| JP | 2013-010378 A | | 1/2013 | | |
| JP | 2013010378 A | * | 1/2013 | | |
| JP | 5342377 B2 | * | 11/2013 | | |
| JP | 5488538 B2 | * | 5/2014 | | |
| JP | 6319155 B2 | * | 5/2018 | | |
| JP | 6519412 B2 | * | 5/2019 | | |

* cited by examiner

*Primary Examiner* — Nicole T Verley
(74) *Attorney, Agent, or Firm* — Posz Law Group, PLC

(57) ABSTRACT

An airbag includes an annular attachment portion having an opening portion through which a bracket can be inserted and which is open in a substantially square shape. A case includes a protective ring portion having an opening through which the bracket can be inserted and which protects the annular attachment portion. The protective ring portion includes a corner cover portion that covers areas of front and rear corner portions on an upper edge side of an inner peripheral edge of the opening portion.

7 Claims, 14 Drawing Sheets

HEAD PROTECTING AIRBAG DEVICE

CROSS REFERENCE TO RELATED APPLICATIONS

The present application claims the benefit of foreign priority from Japanese Patent Application No. 2018-120184 of Kakimoto, filed on June 25, the entire disclosures of which are incorporated herein by reference.

BACKGROUND OF THE INVENTION

Field of the Invention

The present disclosure relates to a head protecting airbag device mounted on a vehicle, configured by arranging an interior component on an upper edge side of a window.

Background Art

In the related art, a head protecting airbag device mounted on a vehicle having an interior component such as an assist grip is disclosed in JP-A-2013-10378. In the head protecting airbag device, while an annular attachment portion through which a bracket for mounting a fixed portion of the assist grip as an interior component on a body can be inserted is formed in an airbag, a connection ring portion through which the bracket can be inserted and which covers an outside of the annular attachment portion is formed in a case. Thus, the annular attachment portion and the connection ring portion are fitted in the bracket. Thereafter, the fixed portion of the assist grip is fixed to the bracket. Then, the airbag and the case are installed in the body by using the bracket. In the head protecting airbag device according to the related art, the connection ring portion is configured to lock the annular attachment portion, which is disposed to overlap with an intra-vehicle side, by using a locking portion. Further, three locking portions are formed along three sides of an inner edge of the annular attachment portion, and each protrude toward an intra-vehicle side to cover an inner edge of the annular attachment portion.

However, in the head protecting airbag device according to the related art, each of the locking portions is not formed in an area of a corner portion at the inner edge of the annular attachment portion, and the annular attachment portion is mounted on the vehicle in a state in which the corner portion at the inner edge is exposed to the sheet metal bracket. Therefore, in the head protecting airbag device according to the related art, when the airbag is unfolded and inflated, while the airbag swings in the front-rear direction to the annular attachment portion, if a large tensile force is applied to the lower side, the corner portion of the annular attachment portion, in which stress concentration is likely to occur, may cause the inner edge to directly come into contact with an edge of the sheet metal bracket. Thus, the annular attachment portion may be damaged.

SUMMARY OF THE INVENTION

An aspect of the present disclosure is to provide a head protecting airbag device which can accurately suppress damage to an annular attachment portion formed in an airbag even in a configuration in which the airbag and a case are attached to a body side using a bracket for fixing an internal component to the body side.

The aspect of the present disclosure can be achieved by a head protecting airbag device having the following configuration.

There is provided a head protecting airbag device mounted on a vehicle in which an internal component is disposed on an upper edge side of a window, the device including an airbag which is configured to cover the window of the vehicle when being unfolded and inflated and is folded and stored on the upper edge side of the window on an intra-vehicle side and in which the upper edge side when the airbag is completely inflated is attached to a body side of the vehicle at a plurality of points along a front-rear direction, and a synthetic resin case in which a completely folded body of the airbag folded such that a lower edge side approaches the upper edge side when the airbag is completely inflated is accommodated, in which the internal component is disposed near an upper side of the accommodation portion for the airbag, and a fixed portion is fixed to a metal bracket attached to the body side and protruding in a substantially square pole shape toward the intra-vehicle side and is thus attached to the body side, the airbag is configured such that an annular attachment portion having an opening portion which is open in a substantially square shape so as to insert the bracket therethrough is disposed at a position corresponding to the fixed portion on the upper edge side when the airbag is completely inflated, the case includes a protective ring portion having an opening through which the bracket is inserted, and attached to the body side together with the annular attachment portion while protecting the annular attachment portion, and the protective ring portion includes a corner cover portion that covers areas of front and rear corner portions on the upper edge side in an inner peripheral edge of the opening portion and is configured to prevent contact with front and rear corner portions on an upper surface side of the bracket.

In the head protecting airbag device according to the present disclosure, in the airbag, the annular attachment portion through which the bracket for attaching the internal component is inserted covers areas of front and rear corner portions on the upper edge side of the inner peripheral edge of the opening portion by the corner cover portion formed in the protective ring portion of the case, is fitted in the bracket together with the protective ring portion, and is mounted on the vehicle. Thus, the corner cover portion prevents contact between the front and rear corner portions of the opening portion and front and rear corner portions on an upper surface of the bracket. Therefore, when the airbag is unfolded and inflated, even if the annular attachment portion is largely pulled downward while swinging in the front-rear direction, the corner portions on which stress is likely to concentrate on an inner peripheral edge thereof can suppress direct contact with the corner portions of the metal bracket by the corner cover portion formed in the protective ring portion, and thus damage to the annular attachment portion can be accurately suppressed.

Therefore, in the head protecting airbag device according to the present disclosure, even in a configuration in which the airbag and the case are attached to the body side using the bracket for fixing the internal component to the body side, the annular attachment portion formed in the airbag is not in contact with the bracket, and the damage to the annular attachment portion can be accurately suppressed.

Further, in the head protecting airbag device according to the present disclosure, insertion groove portions, through which an upper portion disposed on the upper side of the opening portion of the annular attachment portion can be inserted, may be disposed on a front end side and a rear end side of the protective ring portion, an area between the insertion groove portions of the protective ring portion may be configured as an intra-vehicle side cover portion that covers the intra-vehicle side of the upper portion when the airbag is mounted on the vehicle, and the corner cover portion may be configured with a portion protruding from a lower edge side of the intra-vehicle side cover portion toward an extra-vehicle side.

In the head protecting airbag device having such a configuration, when the upper portion of the annular attachment portion is inserted into the insertion groove portions formed in the front end side and the rear end side of the protective ring portion, areas of the corner portions at the inner peripheral edge of the opening portion are covered by the corner cover portion, and thus the annular attachment portion can be assembled with the protective ring portion. Therefore, the annular attachment portion can be easily assembled to the protective ring portion.

Further, in the head protecting airbag device having the above configuration, the case includes a locking claw portion for preventing extraction of the upper portion in a state of being inserted into the insertion groove portions, and a lateral locking claw portion which is formed in an edge portion on a side separated from the intra-vehicle side cover portion in the insertion groove portions and is configured to press an extra-vehicle side of the upper portion after the insertion and an upper locking claw portion which is formed at a position above the insertion groove portions and is configured to lock an upper side of the upper portion after the insertion may be disposed as the locking claw portion.

According to the head protecting airbag device having such a configuration, the lateral locking claw portion can regulate large separation of the upper portion inserted into the insertion groove portions from the intra-vehicle cover portion to the extra-vehicle side. Further, the upper locking claw portion can regulate upward movement of the upper portion inserted into the insertion groove portions such that the upper portion is extracted from the insertion groove portions. Therefore, a state in which the upper portion is inserted into the insertion groove portions can be stably maintained. For example, when an airbag assembly is transported in a state in which the completely folded body is accommodated in the case, or the like, as the lateral locking claw portion and the upper locking claw portion cooperate with each other, extraction of the annular attachment portion from the insertion groove portions can be accurately prevented, and workability of the airbag assembly is improved.

Further, in the head protecting airbag device having the above configuration, guide wall portions, of which tip ends are formed to be inclined toward an upper side of an extra-vehicle side and which serve as guides when the upper portion is inserted into the insertion groove portions, may be formed in areas which are front and rear opposite sides of the intra-vehicle side cover portion. In the head protecting airbag device having such a configuration, when the annular attachment portion is attached to the protective ring portion to overlap the intra-vehicle side, after the upper portion overstrides the intra-vehicle side cover portion, the upper portion can be smoothly inserted into the insertion groove portions along the guide wall portions disposed on front and rear opposite sides. Therefore, an insertion operation when lateral portions of the upper portion are inserted into the insertion groove portions becomes easy.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
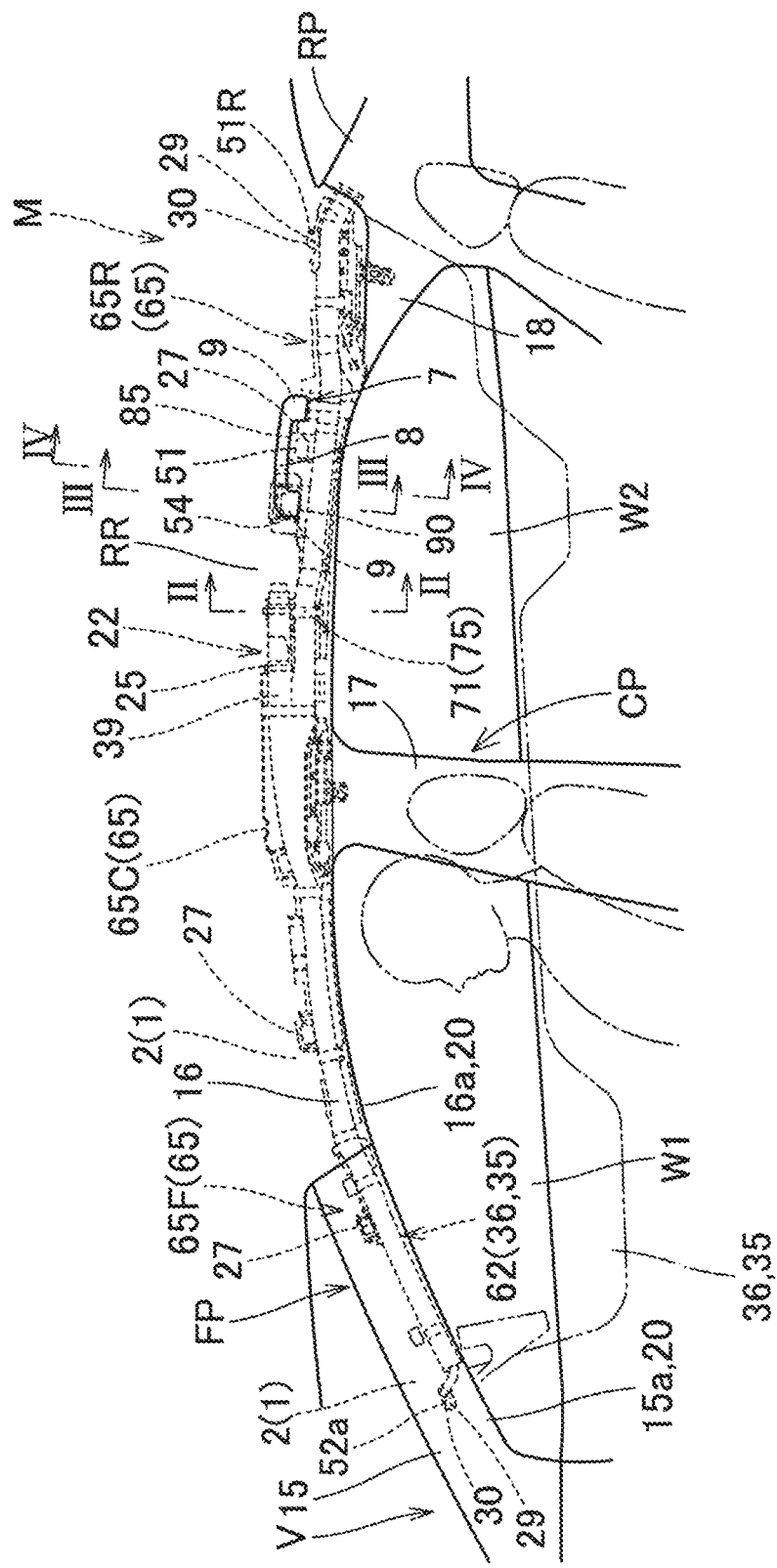
FIG. 1 is a schematic front view showing a head protecting airbag device according to an embodiment of the present disclosure when viewed from an intra-vehicle side.

An embodiment of the present disclosure will be described with reference to the drawings. As shown in FIG. 1, a head protecting airbag device M according to the embodiment is mounted on a vehicle V which has two windows (side windows) W1 and W2 and in which an assist grip 7 as an interior component is disposed on an upper edge side of the rear window W2. Thus, as shown in FIG. 1, the head protecting airbag device M according to the embodiment has an airbag 35 which can cover the windows (the side windows) W1 and W2 of the vehicle V when being completely inflated. The airbag 35 is folded and accommodated at circumferences of the upper edge sides of the windows W1 and W2 between the assist grip 7 and the windows W1 and W2, that is, from a front pillar portion FP via a roof side rail portion RR to the vicinity of an upper side of a rear pillar portion RP. In the case of the embodiment, in the vehicle V, a center pillar portion CP arranged in the substantially vertical direction is disposed between the front pillar portion FP and the rear pillar portion RP. Thus, as indicated by a two-dot chain line of FIG. 1, the airbag 35, when being completely inflated, is configured to also cover intra-vehicle sides of a part of an intermediate pillar garnish 17 disposed in the center pillar portion CP and a part of a rear pillar garnish 18 disposed in the rear pillar portion RP together the windows W1 and W2.

In the embodiment, unless particularly mentioned, description will be made in a state in which upward, downward, forward, and rearward directions coincide with upward, downward, forward, and rearward directions of the vehicle V when the airbag 35 is mounted on the vehicle.

Figure 3:
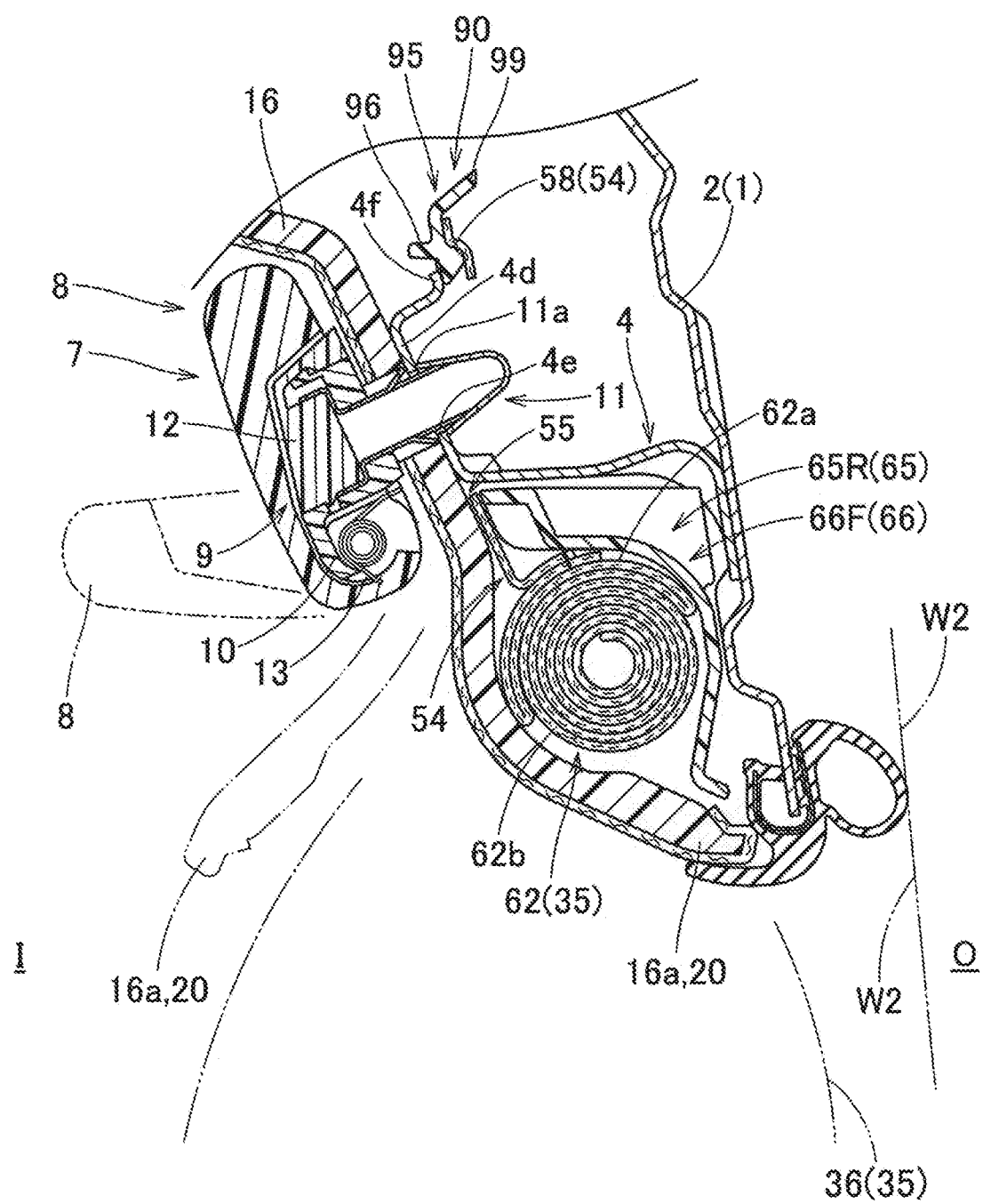
FIG. 3 is a vertical sectional view showing a state in which the head protecting airbag device according to the embodiment is mounted on the vehicle, which corresponds to a portion taken along line III-III of FIG. 1.

In the case of the embodiment, the assist grip 7 as an interior component is disposed in an area of the upper edge side of the window W2, and thus has a substantially reverse U-shaped gripping portion 8 to be gripped by a crew and fixed portions 9 and 9 disposed at front and rear opposite sides of the gripping portion 8. In the case of the embodiment, as shown in FIG. 3, as the fixed portions 9 and 9 are fixed to a bracket 4 attached to an inner panel 2 on a body 1 side, the assist grip 7 is installed in the body 1 side. The bracket 4 protrudes from the inner panel 2 in a substantially square pole shape. In the case of the embodiment, the bracket 4 is formed of sheet metal and is formed in a substantially quadrangular pyramid shape with both the left and right sides open (see FIG. 15). An attachment hole 4e of the bracket 4, which can lock a locking piece 11 of the fixed portion 9, which will be described below, is formed in an intra-vehicle side wall portion 4d located on an intra-vehicle side. The attachment hole 4e is open in a substantially rectangular shape. Further, in the bracket 4 according to the embodiment, a protrusion portion 4f for temporarily fixing a protective ring portion 90 of a case 65R, which will be described below, is formed to protrude upward from substantially a center of an upper surface 4a (an upper wall portion) in a front-rear direction (see FIGS. 3 and 15). Further, each fixing portion 9 of the assist grip 7 includes a base 10 rotatably connected to an end portion of the gripping portion 8 with a hinge mechanism 13 interposed therebetween, the locking piece 11 formed to protrude from the base 10 to an extra-vehicle side O and locked by a circumference of the attachment hole 4e, and a cap 12 for stabilizing the fixation of the locking piece 11 to the bracket 4. The locking piece 11 is disposed to penetrate a roof head lining 16 so as to protrude to the extra-vehicle side O, and is configured by bending a leaf spring. The locking piece 11 fixes the fixing portion 9 to the bracket 4 by locking an edge portion 11a on a base portion side to the circumference of the attachment hole 4e formed in the bracket 4 (see FIG. 3).

As shown in FIG. 1, the head protecting airbag device M includes the airbag 35, an inflator 22 that supplies inflation gas to the airbag 35, an attachment bracket 29, an attachment clip 27, and a case 65 that accommodates the folded airbag 35 (a completely folded body 62). When the airbag is mounted on the vehicle V, the completely folded body 62, the inflator 22, and the case 65 are accommodated in a state in which an intra-vehicle side I is covered by an airbag cover 20 (see FIGS. 1 to 4). The airbag cover 20 is configured with a lower edge 15a of the front pillar garnish 15 covering an intra-vehicle side of the front pillar portion FP and a lower edge 16a of the roof head lining 16 covering an intra-vehicle side of the roof side rail portion RR.

The front pillar garnish 15 and the roof head lining 16 together with the intermediate pillar garnish 17 and the rear pillar garnish 18 are made of synthetic resin and are attached to an intra-vehicle side I of the inner panel 2 that is a member on the body 1 side of the front pillar portion FP and the roof side rail portion RR by not-shown attachment means. Thus, the airbag cover 20 configured with these lower edges 15a and 16a is pressed by the airbag 35 to cause the airbag 35 to protrude at a time of unfolding and inflation so that the lower edges 15a and 16a are opened to the intra-vehicle side I (see FIGS. 2 and 4).

As shown in FIG. 1, the inflator 22 supplies inflation gas to the airbag 35, is a substantially cylindrical cylinder type, and has a not-shown gas discharge port, which can discharge the inflation gas, on a tip end side thereof. In the inflator 22, the tip end side including the gas discharge port is connected to a connection port 39 of the airbag 35 using a clamp 25. Further, although detailed illustration is omitted, the inflator 22 is attached to the inner panel 2 using an attachment bracket and a bolt.

Figure 5:
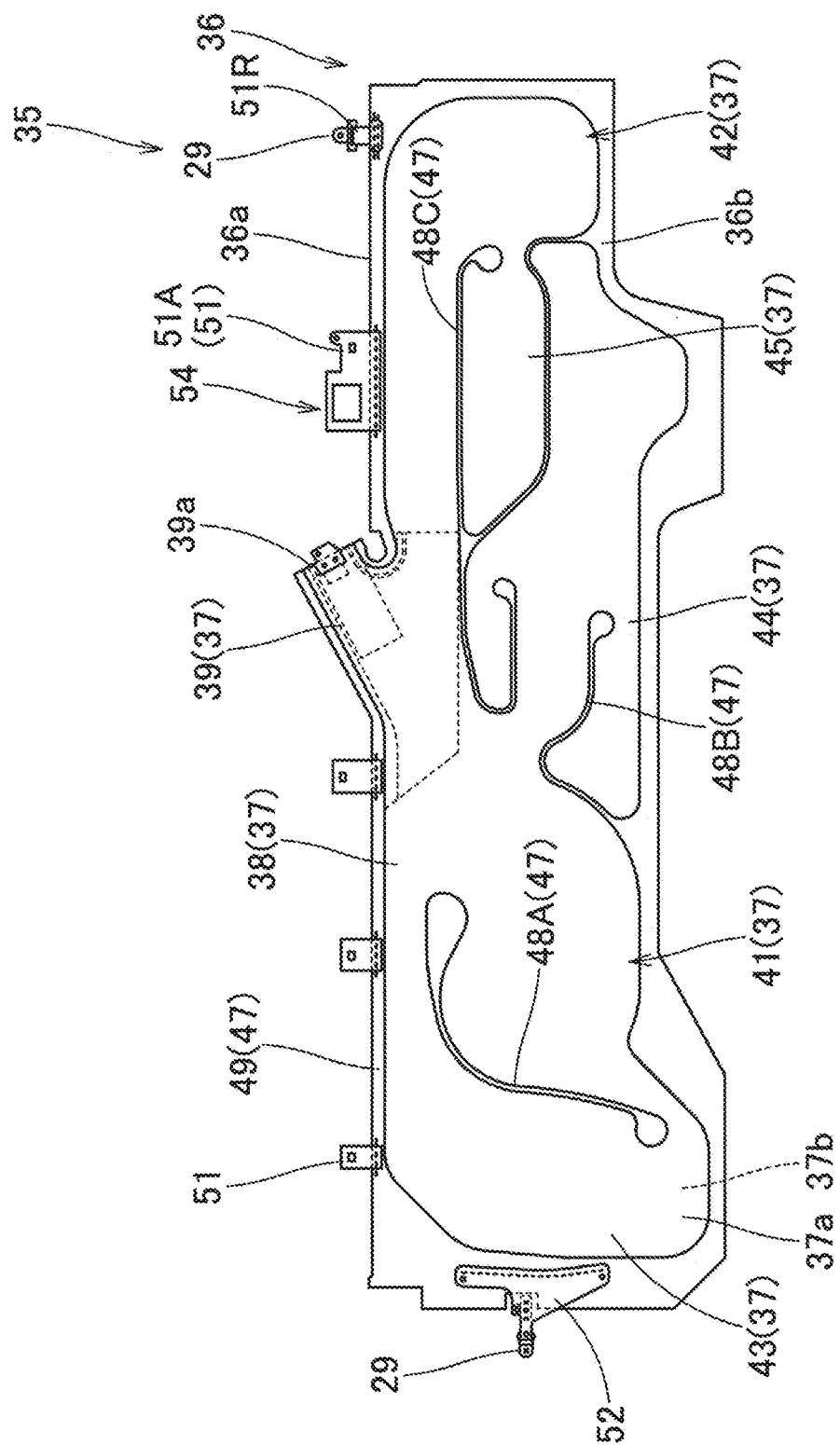
FIG. 5 is a schematic front view showing a state in which an airbag used in the head protecting airbag device according to the embodiment is unfolded flatly.

When the inflation gas from the inflator 22 flows into the airbag 35. The airbag 35 is unfolded from a folded state and is unfolded and inflated to cover the intra-vehicle sides of the windows W1 and W2, and the intermediate pillar garnish 17 and the rear pillar garnish 18 of the intermediate pillar portion CP and the rear pillar portion RP, as indicated by a two-dot chain line of FIG. 1. In the case of the embodiment, as shown in FIG. 5, the airbag 35 includes a bag body 36 that covers the intra-vehicle sides of the windows W1 and W2 when the inflation is completed, attachment piece portions 51, an annular attachment portion 54, and an attachment belt 52. The attachment piece portions 51 and the annular attachment portion 54 are portions that are formed to protrude upward from an upper edge 36a side of the bag body 36 and are attached to the upper edge sides of the windows W1 and W2. The attachment belt 52 protrudes forward from the vicinity of an upper end of a front edge of the bag body 36.

As shown in a two-dot chain line of FIG. 1 and FIG. 5, when the inflation is completed, an outer shape of the bag body 36 is a substantially rectangular shape that can cover the intra-vehicle side from the window W1 via the intermediate pillar portion CP and the window W2 to the front side of the rear pillar portion RP and is substantially along a longitudinal direction in the front-rear direction. The bag body 36 is manufactured by double elastic webbing using polyamide yarn, polyester yarn, or the like. The bag body 36 includes an inflation portion 37 into which the inflation gas flows and which is thus inflated such that an intra-vehicle wall portion 37a located on the intra-vehicle side and an extra-vehicle wall portion 37b located on the extra-vehicle side are separated from each other when the inflation is completed and a non-inflation portion 47 (a closed portion) which is formed by combining the intra-vehicle wall portion 37a and the extra-vehicle wall portion 37b and into which the inflation gas does not flow.

As shown in FIG. 5, the inflation portion 37 includes a gas guiding flow passage 38 disposed to extend in the front-rear direction at the upper edge 36a side of the bag body 36, a connection port portion 39 connected to the inflator 22, a front seat protecting portion 41 that covers the window W1 on the lateral side of a front seat, a rear seat protecting portion 42 that covers the window W2 on the lateral side of a rear seat, a front sub-inflation portion 43 and a central sub-inflation portion 44 disposed adjacent to the front seat protecting portion 41 on the front side and the rear side of the front seat protecting portion 41, respectively, and a rear sub-inflation portion 45 disposed adjacent to the rear seat protecting portion 42 on the front side of the rear seat protecting portion 42. The connection port portion 39 communicates with the gas guiding flow passage 38 substantially at the center of the gas guiding flow passage 38 in the front-rear direction, is inclined rearward and upward with respect to the gas guiding flow passage 38, and is formed to protrude upward from the gas guiding flow passage 38. The connection port portion 39 is open at a rear end 39a side into which the inflator 22 can be inserted. The front sub-inflation portion 43 and the central sub-inflation portion 44 communicate with the front seat protecting portion 41, and the rear sub-inflation portion 45 communicates with the rear seat protecting portion 42. The front sub-inflation portion 43, the central sub-inflation portion 44, and the rear sub-inflation portion 45 cause the inflation gas to flow into the airbag 35 through the front seat protecting portion 41 and the rear seat protecting portion 42. Thus, the front sub-inflation portion 43, the central sub-inflation portion 44, and the rear sub-inflation portion 45 are completely inflated after the front seat protecting portion 41 and the rear seat protecting portion 42 are completely inflated. Thus, in the case of the embodiment, as shown in FIG. 5, the bag body 36 is configured to cause the inflation gas to flow into the airbag 35 through substantially the entire surface thereof except for a small area including partition portions 48A, 48B, and 48C that partition the gas guiding flow passage 38, the front seat protecting portion 41, the rear seat protecting portion 42, the front sub-inflation portion 43, the central sub-inflation portion 44, and the rear sub-inflation portion 45.

The non-inflation portion 47 (the closed portion) includes a peripheral edge portion 49 constituting an outer peripheral edge of the inflation portion 37 and the partition portions 48A, 48B, and 48C disposed in an area of the inflation portion 37. As shown in FIG. 5, the peripheral edge portion 49 is formed to surround the entire periphery of the inflation portion 37 except for the rear end 39a side of the connection port portion 39. The partition portions 48A, 48B, and 48C, which have substantially linear shapes, are arranged to partition the gas guiding flow passage 38, the front seat protecting portion 41, the rear seat protecting portion 42, the front sub-inflation portion 43, the central sub-inflation portion 44, and the rear sub-inflation portion 45.

Figure 6:
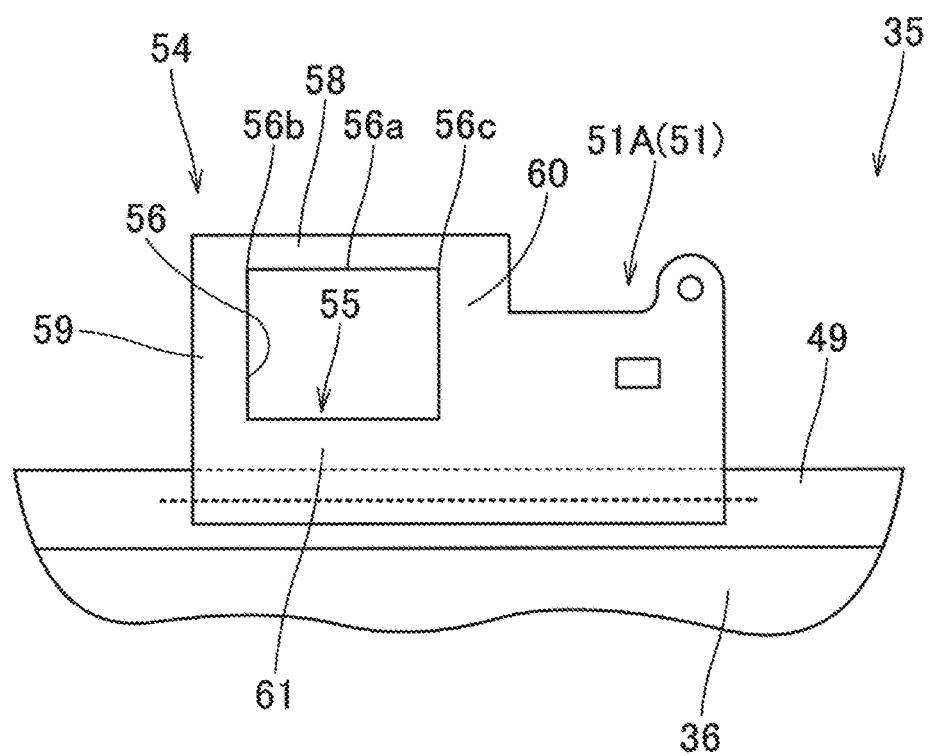
FIG. 6 is a partially enlarged front view showing a portion of an annular attachment portion in the airbag of FIG. 5.

The attachment piece portion 51, the annular attachment portion 54, and the attachment belt 52 are portions for attaching the upper edge 36a side of the airbag 35 (the bag body 36) to the inner panel 2 which is the body 1 side of the vehicle V. In the embodiment, the attachment piece portion 51, the annular attachment portion 54, and the attachment belt 52 are formed of woven fabric made of polyamide yarn, polyester yarn, or the like, separately from the bag body 36. Further, base sides of the attachment piece portion 51, the annular attachment portion 54, and the attachment belt 52 are sewn (combined) with an upper edge side and a front edge side of the bag body 36 using suture thread. The plurality of (in the embodiment, five) attachment piece portions 51 are arranged along the front-rear direction and are formed to protrude upward from the upper edge 36a of the bag body 36. In the case of the embodiment, as shown in FIGS. 5 and 6, an attachment piece portion 51A disposed on the rear side of the annular attachment portion 54 is formed integrally with the annular attachment portion 54. The attachment belt 52 is formed to protrude forward from a front edge of the bag body 36. Although detailed description is omitted, in the airbag 35 according to the embodiment, four attachment piece portions 51 (51A) disposed on the front side are attached to the inner panel 2 using the attachment clips 27, and a tip end 52a of the attachment belt 52 and the attachment piece portion 51R disposed on the rear end side are attached to the inner panel 2 using the attachment bracket 29 and a bolt 30 (see FIG. 1).

Figure 4:
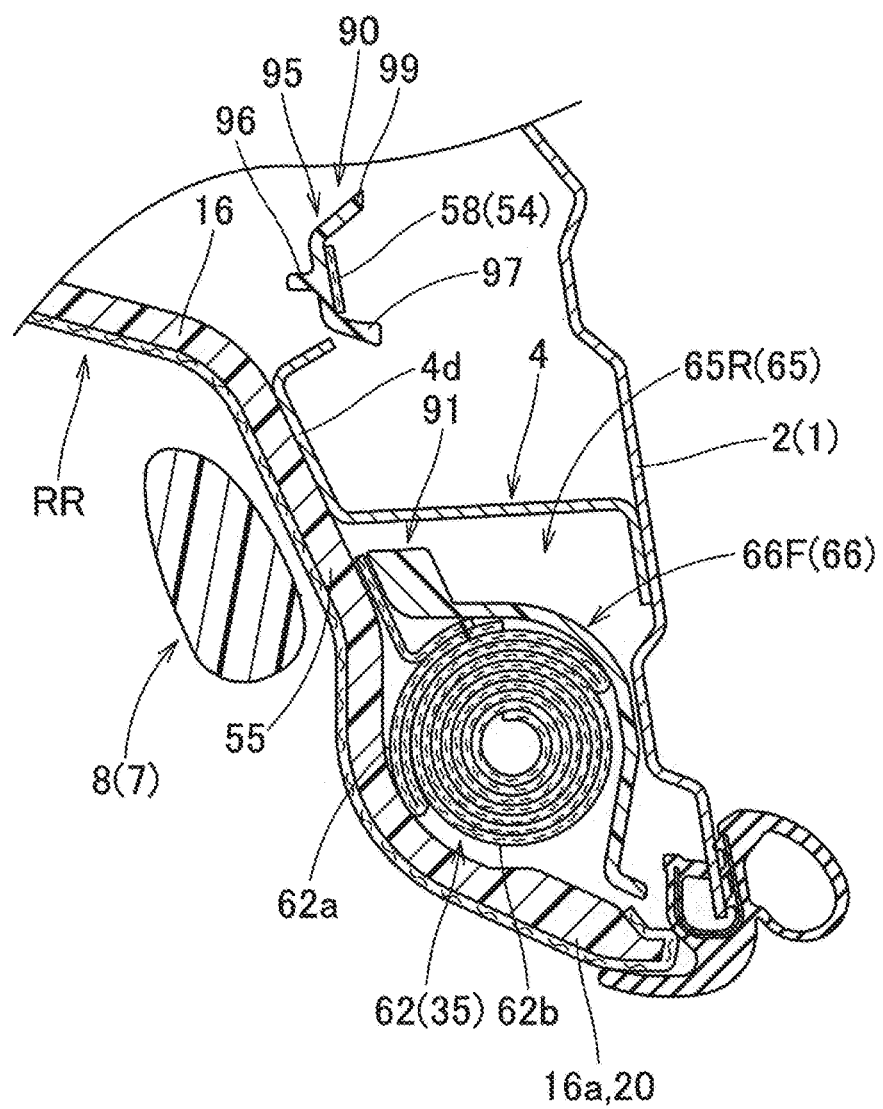
FIG. 4 is a vertical sectional view showing a state in which the head protecting airbag device according to the embodiment is mounted on the vehicle, which corresponds to a portion taken along line IV-IV of FIG. 1.

As shown in FIGS. 1, 3, and 4, the annular attachment portion 54 is disposed at a position corresponding to the fixed portion 9 on the front side of the assist grip 7. The annular attachment portion 54 has an opening portion 55 through which the bracket 4 for attaching the fixed portion 9 of the assist grip 7 can be inserted and which is open in a substantially square shape. In detail, the annular attachment portion 54 has a substantially annular square outer shape, and a lower area of the annular attachment portion 54 on a rear edge side is connected to the attachment piece portion 51A and is thus formed integrally with the attachment piece portion 51A as described above. In the case of the embodiment, the opening portion 55 is open in a substantially square shape that is slightly wide in the front-rear direction. In detail, the opening portion 55 is formed to have a slightly larger opening shape than an opening portion 91 of the protective ring portion 90, which will be described below (see FIG. 17).

Figure 2:
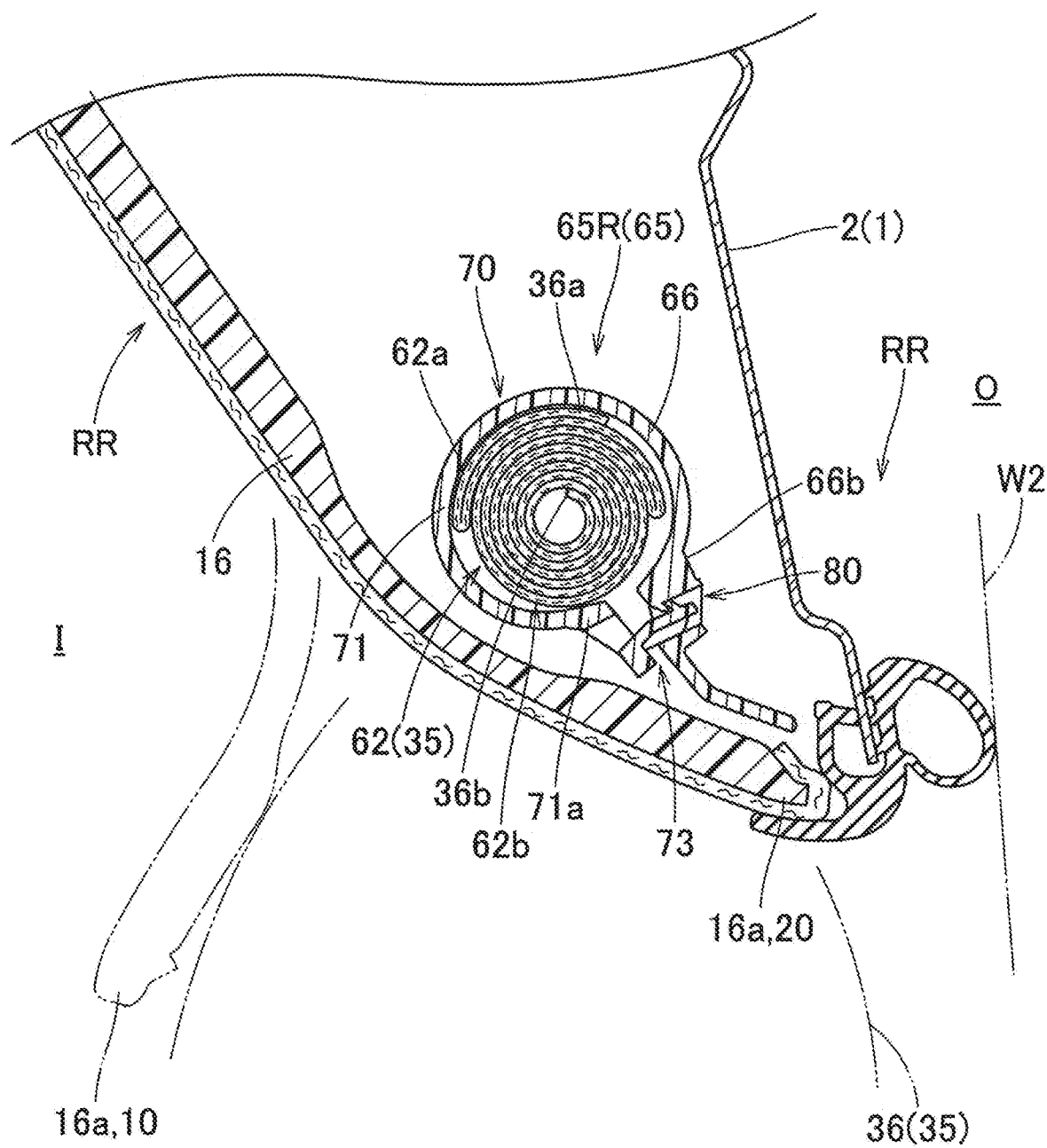
FIG. 2 is a vertical sectional view showing a state in which the head protecting airbag device according to the embodiment is mounted on the vehicle, which corresponds to a portion taken along line II-II of FIG. 1.

In the embodiment, a portion of the airbag 35 on the upper edge 36a side of the bag body 36 is folded in a bellows manner, and the airbag 35 is folded by roll folding such that an area of the airbag 35 on a lower side is wound from a lower edge 36b side toward the extra-vehicle side O. As shown in FIGS. 2 to 4, the completely-folded body 62 formed by folding the airbag 35 is configured such that a bellows folded portion 62a is loaded on an upper side of a roll folded portion 62b.

The case 65 that accommodates the folded airbag 35 (the completely folded body 62) is made of a thermoplastic elastomer. In the case of the embodiment, the case 65 is made of a polyolefin-based thermoplastic elastomer (TPO). The case 65 has an elongated shape extending in the front-rear direction. In the head protecting airbag device M according to the embodiment, as shown in FIG. 1, three cases including a case 65F that accommodates an area of the completely folded body 62 on a front end side, a case 65C that accommodates an area near the connection port portion 39, and a case 65R that accommodates an area of the connection port portion 39 on a rear side are used. In the embodiment, the case 65R disposed on the rear side will be described as an example in detail. The case 65 protects the folded airbag 35 (the completely folded body 62) while the airbag 35 is transported, is mounted on the vehicle, and is inflated, also serves as a protector that guides an unfolding direction during the inflation, and is disposed around the completely folded body 62 to cover the completely folded body 62 from a surrounding interference object.

Figure 7:
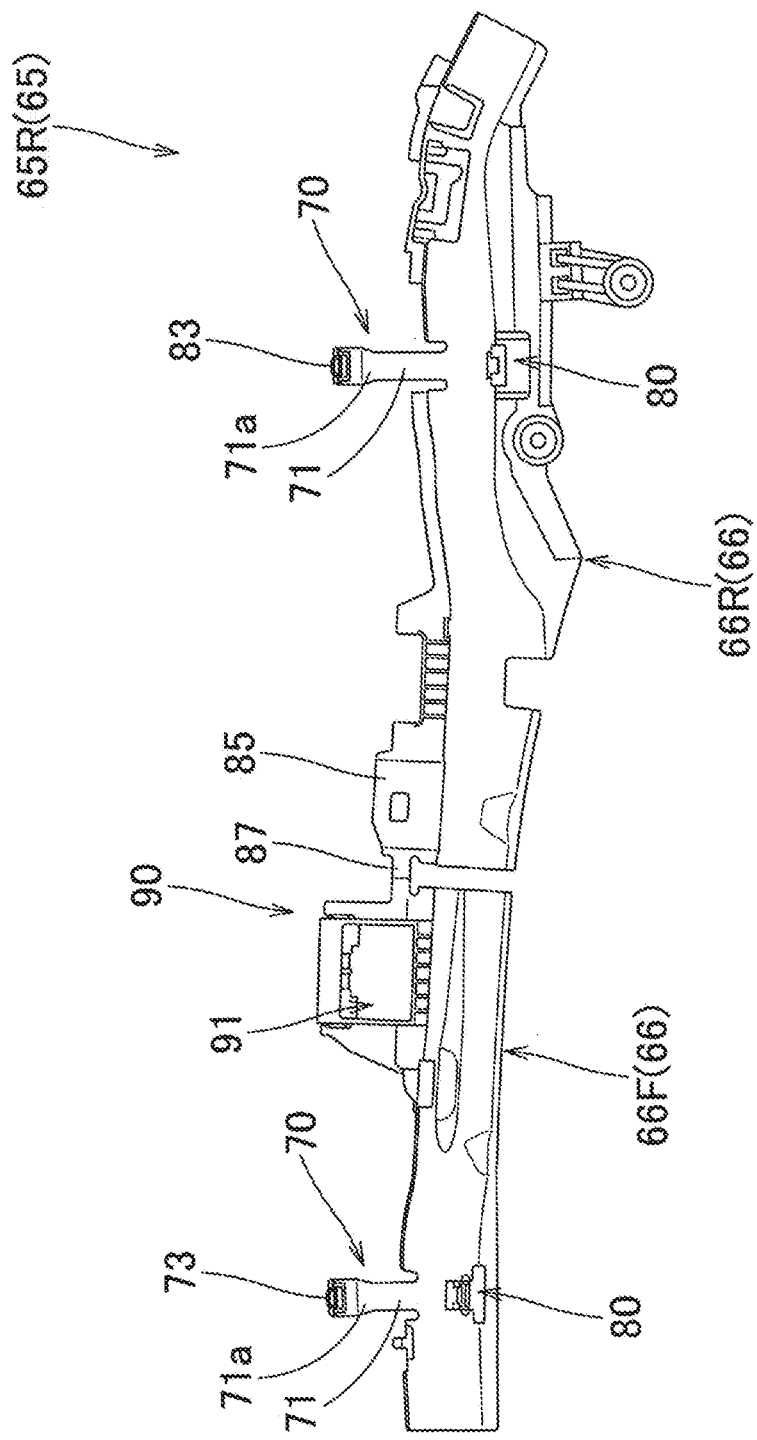
FIG. 7 is a schematic front view showing a case used in the head protecting airbag device according to the embodiment.

As shown in FIG. 7, the case 65R includes a case body 66 that accommodates the completely folded body 62, winding band portions 70 wound around the completely folded body 62 accommodated in the case body 66, an attachment seat portion 85 attached to the inner panel 2 on the body 1 side, and the protective ring portion 90 formed at a position corresponding to the annular attachment portion 54.

The case body 66 is formed to be curved in a substantially arc shape along an outer peripheral surface of the completely folded body 62 to cover the extra-vehicle side O to the upper side of the completely folded body 62 (see FIGS. 2 to 4). In the case 65R according to the embodiment, as shown in FIG. 7, the case body 66 is divided into two parts to be separated in the vicinity of a boundary portion between the protective ring portion 90 and the attachment seat portion 85. The case 65 according to the embodiment, which is configured with two divided parts of the case bodies 66F and 66R, is integrally formed by connecting the protective ring portion 90 and the attachment seat portion 85 through a connection belt 87.

In the case of the embodiment, the winding band portions 70 are formed at two points of a front end side of the front case body 66F and a slightly rear side of a center of the rear case body 66R in the front-rear direction. As shown in FIGS. 2 and 7, the winding band portion 70 includes a substantially band-shaped band body 71 extending from an upper edge of the case body 66, a locking portion 73 disposed on a tip end 71a side of the band body 71, and a locked portion 80 formed on the case body 66 side to insert and lock the locking portion 73.

The attachment seat portion 85 is formed at a position corresponding to the attachment piece portion 51 disposed to protrude from the completely folded body 62. In the case of the embodiment, the attachment seat portion 85 is formed close to the rear side of the protective ring portion 90, which corresponds to a front end side of the case body 66R. Further, the attachment seat portion 85 is connected to the protective ring portion 90 near an intermediate portion thereof in an up-down direction by the connection belt 87. Although detailed illustration is omitted, the attachment seat portion 85 is attached to the inner panel 2 using the attachment clip 27 together with the attachment piece portion 51A.

Figure 8:
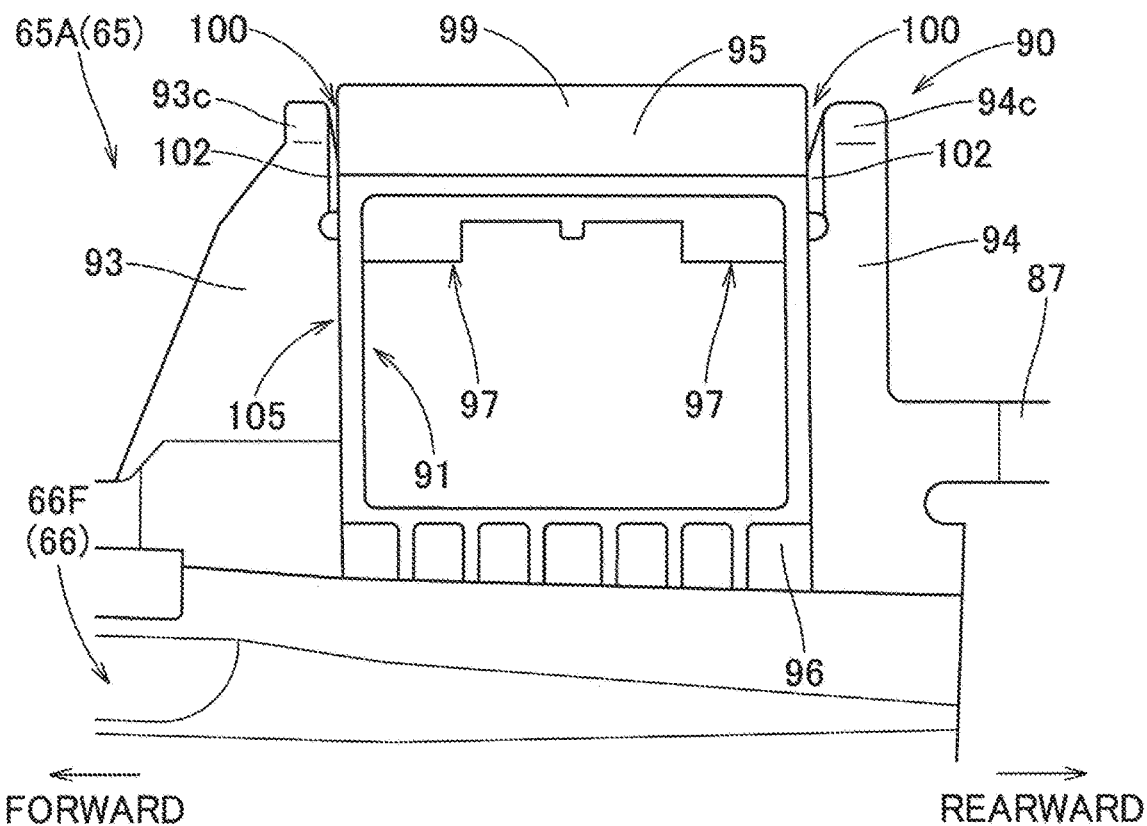
FIG. 8 is a partially enlarged front view showing a portion of a protective ring portion in the case of FIG. 7.

The protective ring portion 90 is formed at a position corresponding to the annular attachment portion 54 disposed to protrude from the completely folded body 62. In the case of the embodiment, as shown in FIG. 7, the protective ring portion 90 is disposed near the rear end of the case body 66F. The protective ring portion 90 has an opening through which the bracket 4 can be inserted. In detail, the protective ring portion 90 is configured in a substantially square ring shape having the opening portion 91 (an opening) open in a substantially rectangular shape that is slightly wide in the front-rear direction. The protective ring portion 90 includes a front wall portion 93, a rear wall portion 94, an upper wall portion 95, and a lower wall portion 96 constituting a periphery of the opening portion 91. Further, in the embodiment, the protective ring portion 90 includes a protrusion portion 105 that surrounds an outer peripheral side of the opening portion 91 along the entire periphery and protrudes toward the intra-vehicle side I (see FIGS. 8, 10, and 12). When the annular attachment portion 54 is attached, this protrusion portion 105 is disposed to cover an inner peripheral side of the opening portion 55 of the annular attachment portion 54 (see FIG. 16). Further, reinforcing rib portions 93b and 94b protruding along substantially the vertical direction and toward the extra-vehicle side O are formed in the front wall portion 93 and the rear wall portion 94 (see FIGS. 9, 11, and 13). In the case of the embodiment, the upper wall portion 95 is provided with a gap between the front wall portion 93 and the rear wall portion 94 to be located more inward than the front wall portion 93 and the rear wall portion 94, and is formed in a step-like shape with respect to the front wall portion 93 and the rear wall portion 94 (see FIGS. 10 and 11). In other words, the front wall portion 93 and the rear wall portion 94 are configured at a position slightly outward of the opening portion 91 in the front-rear direction such that upper ends 93a and 94a are separated from each other with respect to the upper wall portion 95.

Figure 11:
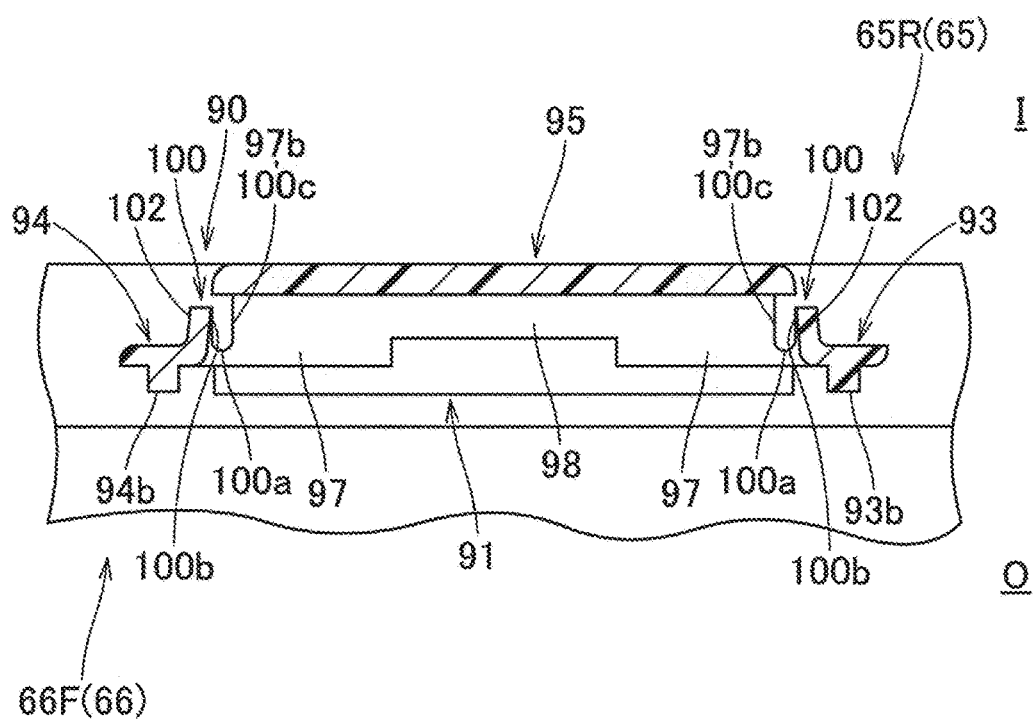
FIG. 11 is a sectional view taken along line XI-XI of FIG. 9.

That is, insertion groove portions 100 and 100 are formed on a front end side and a rear end side of the protective ring portion 90 to be cut away from an upper edge side thereof. The insertion groove portions 100 are configured by gaps between this upper wall portion 95 and the front wall portion 93 and the rear wall portion 94 and are formed to allow depressed tip ends 100a to enter an area of a corner cover 97, which will be described below, as shown in FIG. 11. This insertion groove portions 100 are for inserting an upper portion 58 disposed on the upper side of the opening portion 55 in the annular attachment portion 54. The annular attachment portion 54 is locked to the protective ring portion 90 by inserting the upper portion 58 into the two insertion groove portions 100 and 100 (see FIGS. 17 to 19). At this time, the intra-vehicle side I of the upper portion 58 of the annular attachment portion 54 is covered by the upper wall portion 95, and positions a front portion 59, a rear portion 60, and a lower portion 61 other than the upper portion 58 is arranged on the intra-vehicle side I of the protective ring portion 90. That is, in the embodiment, the upper wall portion 95 (an area between the insertion groove portions 100 and 100) in the protective ring portion 90 constitutes an intra-vehicle side cover portion that covers the intra-vehicle side of the upper portion 58 when the airbag 35 is mounted on the vehicle.

Further, the front wall portion 93 and the rear wall portion 94 are configured such that an area on the upper ends 93a and 94a side separated from the upper wall portion 95 is located lower than the upper end side (an upper cover portion 99 which will be described below) of the upper wall portion 95, and are inclined such that tip ends thereof are directed to the upper side of the extra-vehicle side (see FIGS. 13 and 14). Thus, the inclined portions of the front wall portion 93 and the rear wall portion 94 on the upper ends 93a and 94a sides constitute guide wall portions 93c and 94c serving as guides when the upper portion 58 is inserted into the insertion groove portions 100 and 100. That is, the guide wall portions 93c and 94c are formed at positions lower than the upper cover portion 99 in areas which are front and rear opposite sides of the upper wall portion 95 constituting the intra-vehicle side cover portion.

Corner cover portions 97 and 97 that cover areas of front and rear corner portions 56b and 56c on an upper edge 56a side in an inner peripheral edge 56 of the opening portion 55 of the annular attachment portion 54 are formed on a lower edge 95b side of the upper wall portion 95. The corner cover portions 97 are formed to protrude from the lower edges 95b sides toward the extra-vehicle side O in front and rear areas excluding a central area of the upper wall portion 95 in the front-rear direction, respectively, and are formed such that a part of an end edge side on a side separated from the opening portion 91 in the front-rear direction is connected to the front wall portion 93 and the rear wall portion 94. Further, in the case of the embodiment, each of the corner cover portions 97 is inclined with respect to a vehicle interior and exterior direction such that a tip end 97a side is directed to the lower side (see FIG. 13). As described above, in the corner cover portion 97, the depressed tip end 100a of the insertion groove portion 100 is disposed on an end edge 97c side on a side separated from the opening portion 91 in the front-rear direction. The width dimension of the corner cover portion 97 in the front-rear direction is set to one third of the width dimension of the opening portion 91 in the front-rear direction (see FIGS. 9 and 11). Further, the protrusion amount of the corner cover portion 97 to the extra-vehicle side O is the same as the protrusion amount of the upper cover portion 99 formed on the upper wall portion 95, which will be described below (see FIG. 13). Further, a protrusion portion 98 which slightly protrudes toward the extra-vehicle side in a state in which the protrusion amount of the protrusion portion 98 is smaller than the protrusion amount of the corner cover portion 97 is formed on the lower edge 95b side of a central area of the upper wall portion 95 in the front-rear direction in which the corner cover portion 97 is not disposed (see FIG. 12).

Figure 10:
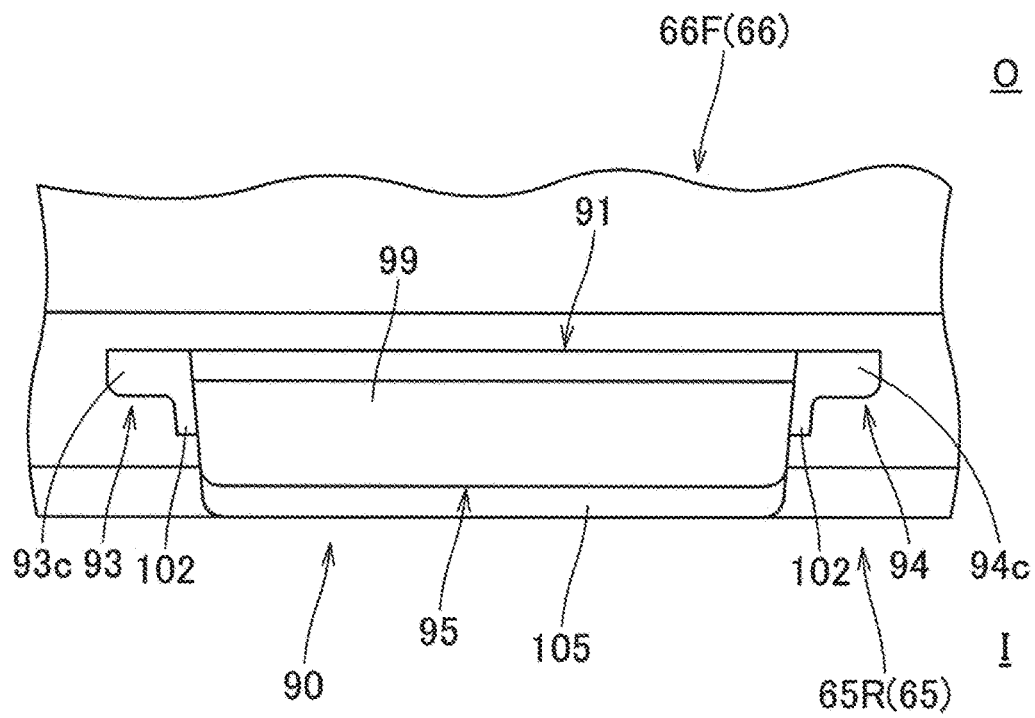
FIG. 10 is a partially enlarged plan view showing the portion of the protective ring portion in the case of FIG. 7.
Figure 12:
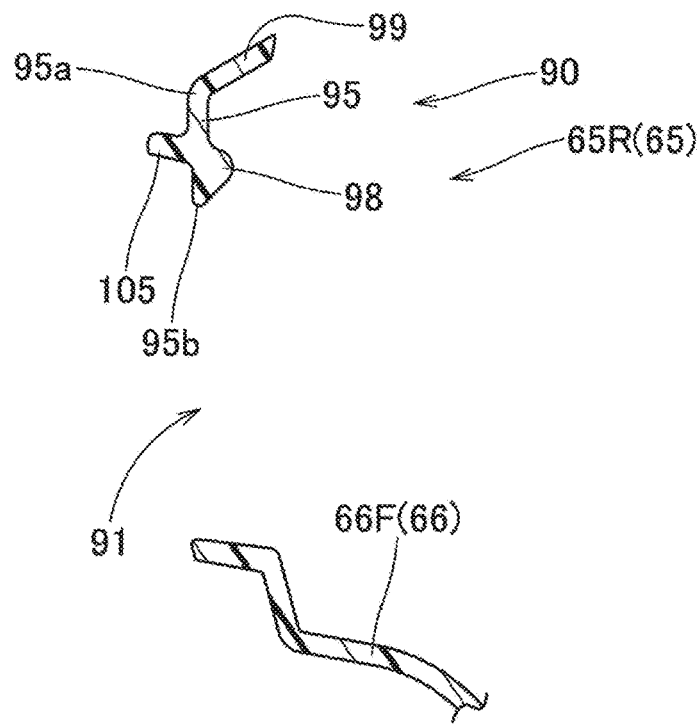
FIG. 12 is a sectional view taken along line XII-XII of FIG. 9.
Figure 13:
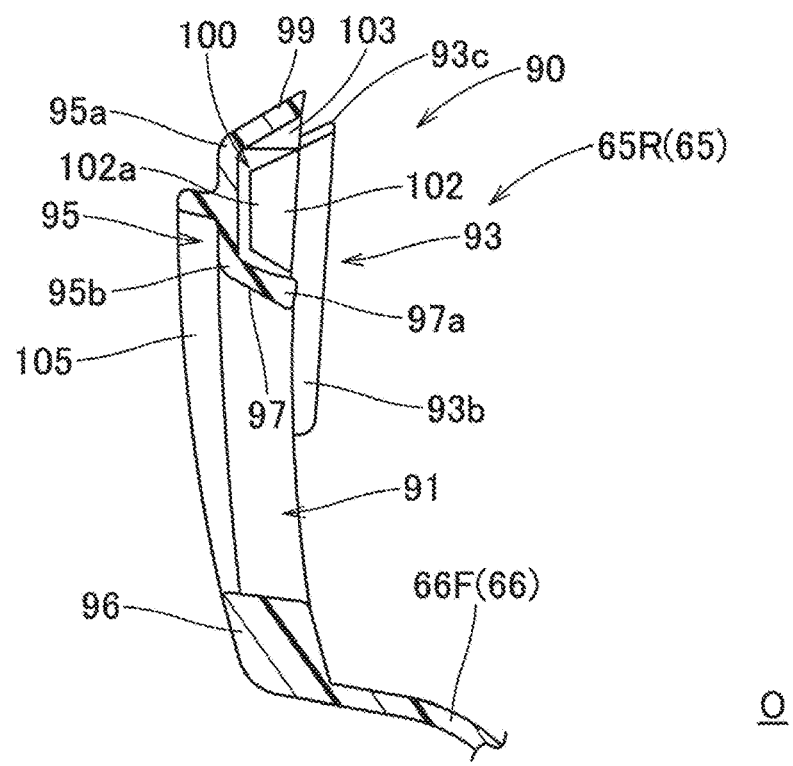
FIG. 13 is a sectional view taken along line XIII-XIII of FIG. 9.

Further, in the embodiment, the upper cover portion 99 that covers an upper side of the upper portion 58 inserted into the insertion groove portions 100 and 100 is formed on the upper edge 95a side of the upper wall portion 95 to protrude to the extra-vehicle side O (see FIGS. 12 and 13). In detail, as shown in FIG. 10, the upper cover portion 99 is formed over substantially the entire area of the upper wall portion 95 in the front-rear direction, is inclined such that a tip end thereof faces an upper side of the extra-vehicle side, and is formed to be substantially symmetric with the corner cover portion 97 in the up-down direction in the vertical section substantially along the vertical direction (see FIG. 13).

Further, a locking claw portion for preventing separation of the upper portion 58 in a state of being inserted into the insertion groove portions 100 and 100 is formed in the protective ring portion 90. In the case of the embodiment, lateral locking claw portions 102 which can press the extra-vehicle side O of the upper portion 58 in a state of being inserted into the insertion groove portions 100 and upper locking claw portions 103 which can lock the upper side of the upper portion 58 that has been inserted into the insertion groove portions 100 are disposed as the locking claw portion (see FIGS. 9 and 11).

Figure 18:
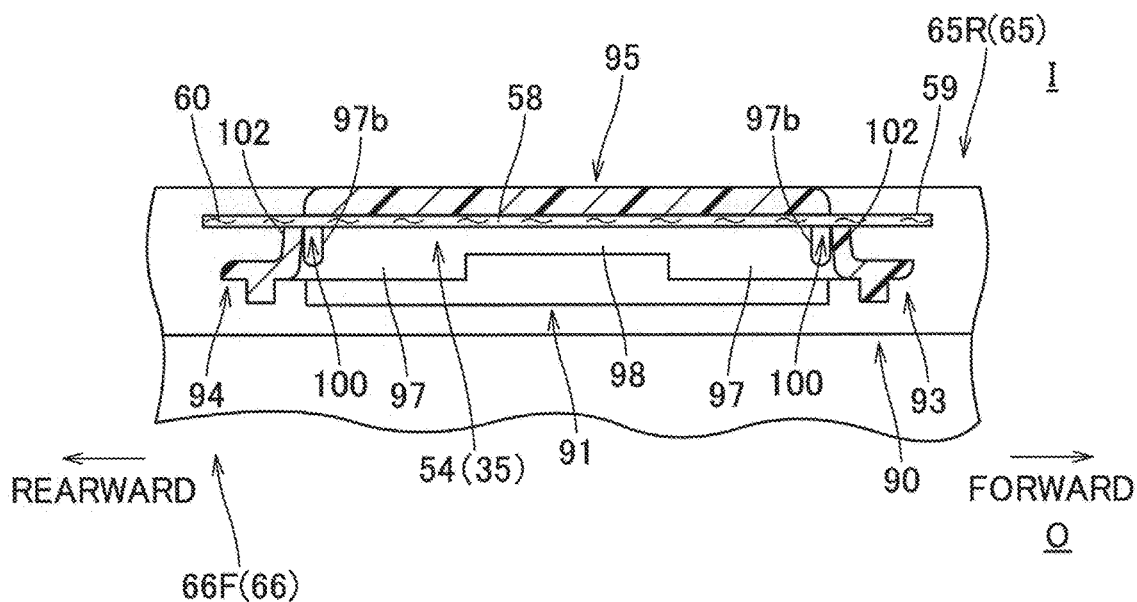
FIG. 18 is a sectional view showing a portion taken along line XVIII-XVIII of FIG. 17.
Figure 19:
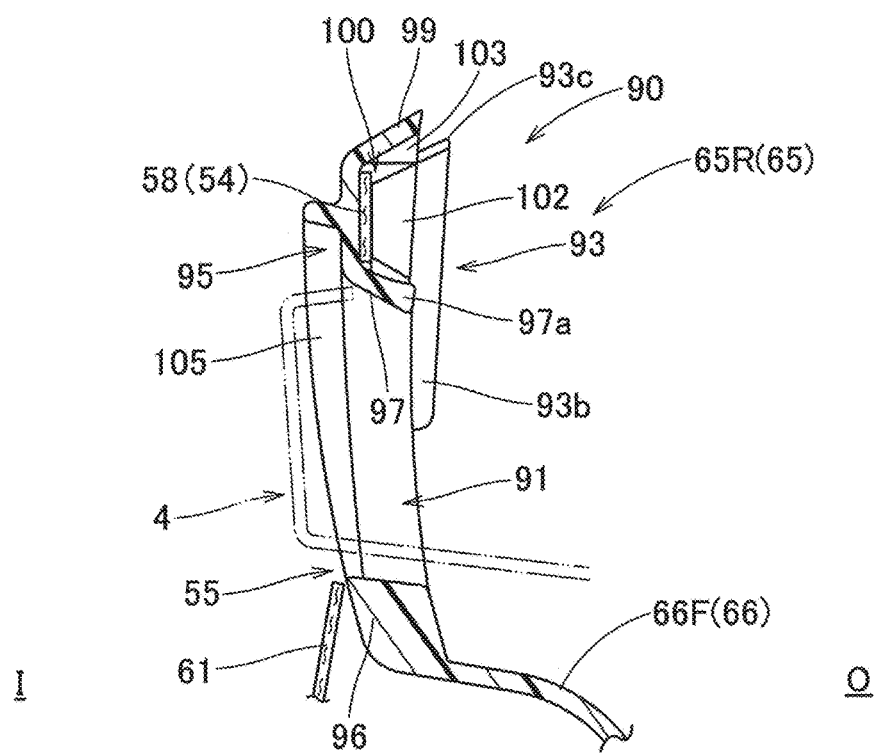
FIG. 19 is a sectional view showing a portion taken along line XIX-XIX of FIG. 16.

In each insertion groove portion 100, the lateral locking claw portions 102 are respectively formed on an edge portion side on a side separated from the upper wall portion 95, that is, on a separation side edge portion 100b side that is the front wall portion 93 side or the rear wall portion 94 side. In the separation side edge portion 100b, the lateral locking claw portions 102 are formed to protrude toward the intra-vehicle side I (see FIG. 11). In detail, in the insertion groove portions 100, the lateral locking claw portions 102 are formed to stand up from an end edge of the front wall portion 93 or the rear wall portion 94 to the intra-vehicle side so as to constitute the end edge of the front wall portion 93 side or the rear wall portion 94 side (see FIG. 14). The outer shape of the lateral locking claw portion 102 is a substantially trapezoidal shape which is narrowed toward a tip end 102a side thereof when viewed from the front-rear direction (see FIG. 13). Thus, the lateral locking claw portion 102 is configured such that the tip end 102a is located on the extra-vehicle side O from the upper wall portion 95 (see FIG. 11), and locks the extra-vehicle side O of the upper portion 58 in a state in which the upper portion 58 is inserted into the insertion groove portions 100, as shown in FIGS. 18 and 19.

Figure 9:
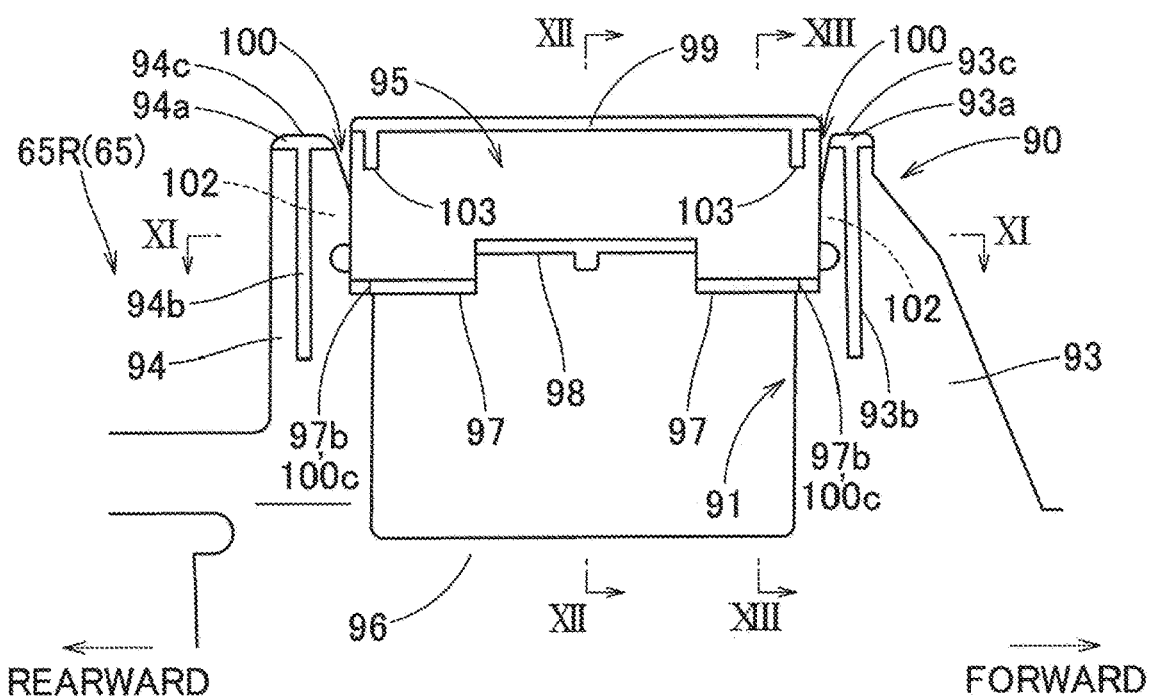
FIG. 9 is a partially enlarged rear view showing the portion of the protective ring portion in the case of FIG. 7.
Figure 14:
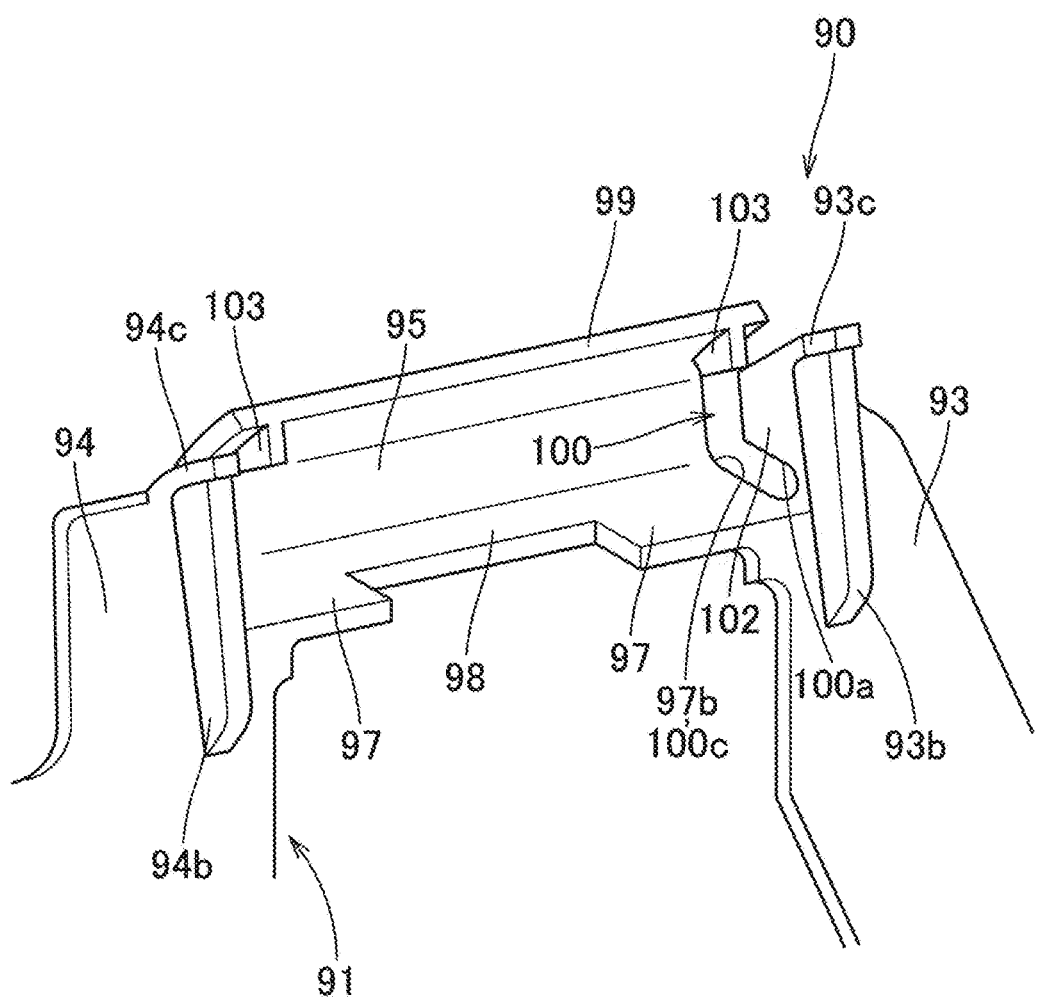
FIG. 14 is a schematic partial enlarged perspective view showing the portion of the protective ring portion in the case of FIG. 7 when viewed from the outside of the vehicle.
Figure 17:
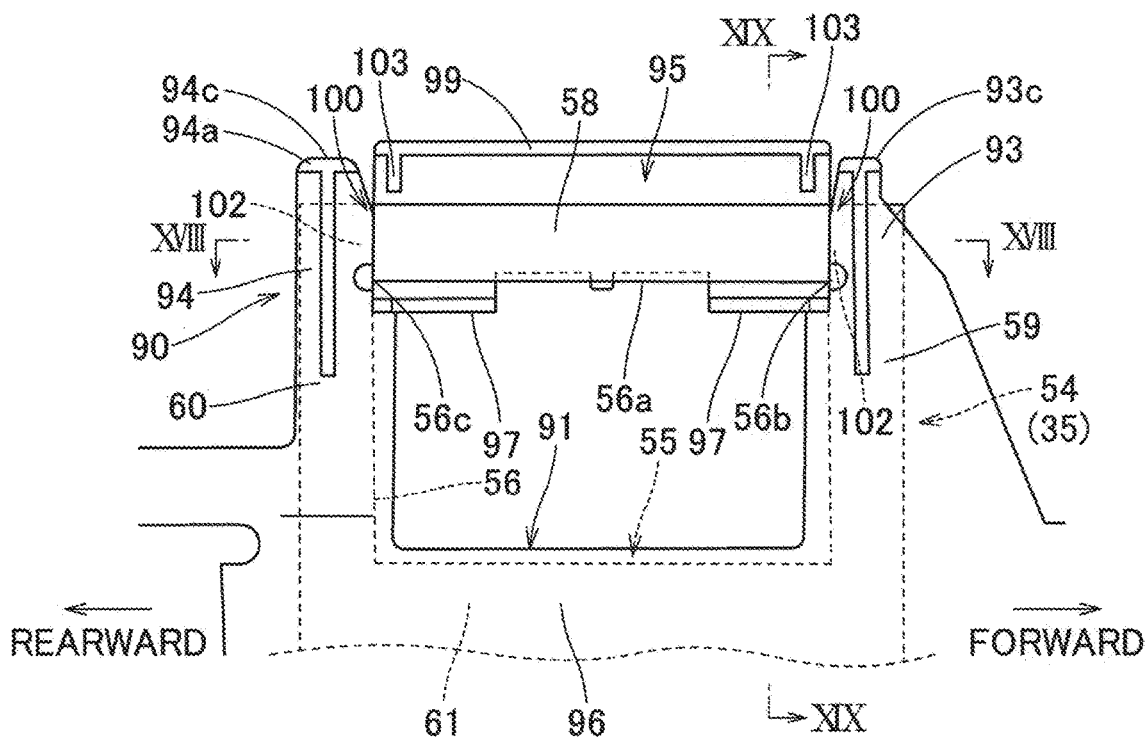
FIG. 17 is a partially enlarged rear view showing a state in which the annular attachment portion of the airbag is locked by the protective ring portion of the case in the head protecting airbag device according to the embodiment.

The upper locking claw portions 103 are formed to protrude downward on a front edge side and a rear edge side of the upper cover portion 99 formed in the upper wall portion 95, respectively (see FIGS. 9 and 14). The outer shape of each upper locking claw portion 103 is a substantially triangular shape in which a gap between the lateral locking claw portion 102 and the upper cover portion 99 is filled when viewed from the front-rear direction (see FIG. 11). Further, the upper locking claw portion 103 is formed at a position that is slightly a central side from the lateral locking claw portion 102 in the front-rear direction in a state in which the protective ring portion 90 is viewed from the vehicle exterior and interior direction (see FIG. 9). The upper locking claw portion 103 locks the upper side of the upper portion 58, as shown in FIGS. 17 and 19, in a state in which the upper portion 58 is inserted into the insertion groove portions 100.

Next, mounting of the head protecting airbag device M on the vehicle V will be described. First, the airbag 35 is folded as shown in FIGS. 2 to 4. In the case of the embodiment, from a state in which the airbag 35 is flatly unfolded to overlap the intra-vehicle wall portion 37a and the extra-vehicle wall portion 37b, a bellows-folded portion 62a is formed by folding an area on the upper edge 36a side in a bellows manner with a fold substantially parallel to the upper edge 36a and a roll-folded portion 62b is formed by folding a lower area by roll folding in which the lower edge 36b is wound on an extra-vehicle side wall portion side, so that the completely folded body 62 is formed. After the airbag 35 is completely folded, the airbag 35 is kept wrapped by a not-shown wrapping material 105 in the form of a tape that can be broken at a time of the inflation at plurality of points in the front-rear direction for preventing folding and breaking of a circumference of the completely folded body 62.

Next, the completely folded body 62 is accommodated in the case 65. At this time, the annular attachment portion 54 is locked to the protective ring portion 90 to insert the upper portion 58 into the insertion groove portions 100 and 100 in the protective ring portion 90 (see FIGS. 16 to 19). Further, in a state in which the attachment piece portion 51 overlaps with the intra-vehicle side of the attachment seat portion 85, the attachment clip 27 is temporarily fixed to the attachment seat portion 85. Further, as shown in FIG. 2, the band body 71 of the winding band portion 70 is wound around the completely folded body 62, the locking portion 73 disposed on the tip end 71a side of the band body 71 is inserted and locked to the locked portion 80, and a circumference of the completely folded body 62 is wrapped by the band body 71 of the winding band portion 70. The attachment bracket 29 is attached to the attachment piece portion 51R and the tip end 52a side of the attachment belt 52. Further, when the inflator 22 attached to the attachment bracket is inserted into the connection port portion 39 of the airbag 35 protruding from the completely folded body 62, and the connection port portion 39 and the inflator 22 are connected to each other by the clamp 25, an airbag assembly can be formed.

Thus, the attachment piece portion 51 and the attachment seat portion 85 are attached to the inner panel 2 on the body 1 side using the attachment clip 27, and the annular attachment portion 54 and the protective ring portion 90 are inserted through the bracket 4 formed in the inner panel 2. At the same time, when the inflator 22 is fixed to the inner panel 2 at a predetermined position, and the attachment bracket 29 attached to the attachment piece portion 51R and the attachment belt 52 is fixed to the inner panel 2 at a predetermined position using the bolt 30, the airbag assembly can be assembled to the vehicle V. Thereafter, a not-shown lead wire extending from a control device for activating the inflator 22 is connected to the inflator 22. After the front pillar garnish 15 and the roof head lining 16 are attached to the inner panel 2 on the body 1 side, when the fixed portion 9 of the assist grip 7 is fixed to the bracket 4 of the inner panel 2, the annular attachment portion 54 and the protective ring portion 90 can be locked to the body 1 side, and the airbag assembly can be attached to the vehicle V. Further, when the intermediate pillar garnish 17 and the rear pillar garnish 18 are attached to the body 1 side, the head protecting airbag device M can be mounted on the vehicle V.

After the head protecting airbag device M is mounted on the vehicle V, when the inflator 22 is activated in response to an activation signal from the control device, the inflation gas discharged from the inflator 22 flows into the airbag 35. Thus, the inflating bag body 36 breaks the wrapping material 105, pushes and opens the airbag cover 20 while releasing the locked state of the locking portion 73 and the locked portion 80 in the winding band portion 70, is unfolded while protruding downward, and is completely inflated to cover the intra-vehicle sides of the windows W1 and W2, the intermediate pillar portion CP, and the rear pillar portion RP, as indicated by a two-dot chain line of FIG. 1.

Figure 15:
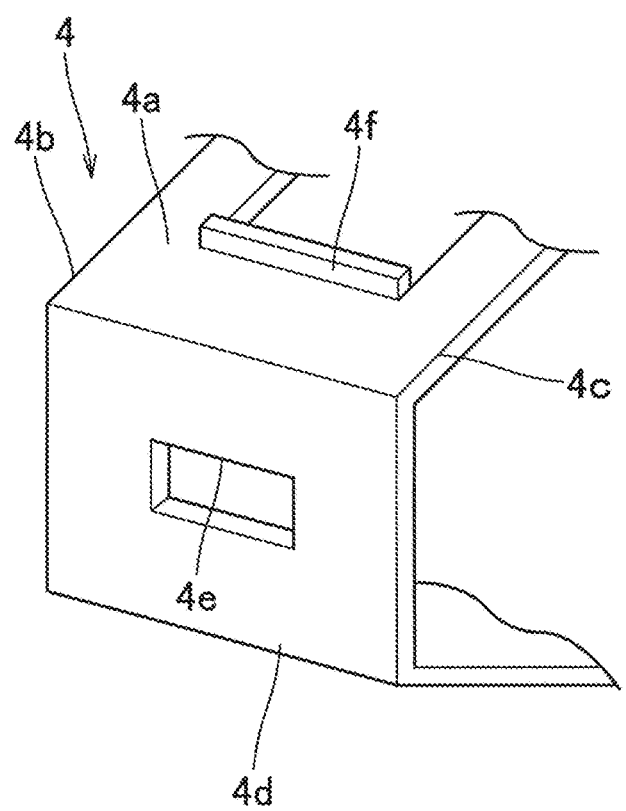
FIG. 15 is a schematic perspective view showing a bracket for fixing an assist grip in a vehicle equipped with the head protecting airbag device according to the embodiment.
Figure 16:
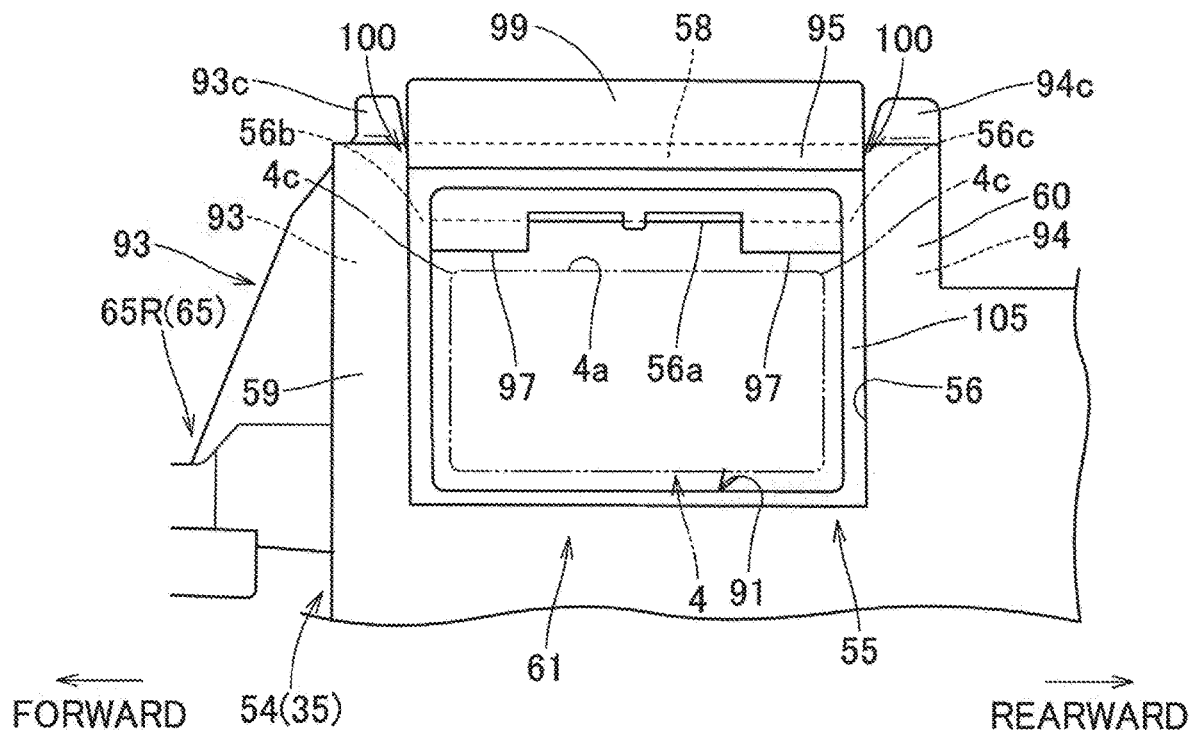
FIG. 16 is a partially enlarged front view showing a state in which the annular attachment portion of the airbag is locked by the protective ring portion of the case in the head protecting airbag device according to the embodiment.

Thus, in the head protecting airbag device M according to the embodiment, in the airbag 35, the annular attachment portion 54, through which the bracket 4 for attaching the assist grip 7 as an internal component is inserted, covered areas of the front and rear corner portions 56b and 56c on the upper edge 56a side of the inner peripheral edge 56 of the opening portion 55 by the corner cover portions 97 and 97 formed in the protective ring portion 90 of the case 65R, as shown in FIGS. 15, 16, and 18, is fitted in the bracket 4 together with the protective ring portion 90, and is mounted on the vehicle V (see FIG. 4). Thus, the corner cover portions 97 and 97 prevent contact between the front and rear corner portions 56b and 56c of the opening portion 55 and the front and rear corners 4b and 4c on the upper surface 4a side of the bracket 4. Therefore, when the airbag 35 is unfolded and inflated, even if the annular attachment portion 54 is largely pulled downward while swinging in the front-rear direction, it is possible to suppress direct contact between the corner portions 56b and 56c of the inner peripheral edge 56 of the opening portion 55, on which stress is likely to concentrate, and the corner portions 4b and 4c of the metal bracket 4, by the corner cover portions 97 and 97 formed in the protective ring portion 90. Thus, damage to the annular attachment portion 54 can be accurately suppressed.

Therefore, in the head protecting airbag device M according to the embodiment, even when the airbag 35 and the case 65 are attached to the body 1 side using the bracket 4 for fixing the assist grip 7 to the body 1 side, the annular attachment portion 54 formed in the airbag 35 is not in contact with the bracket 4, and the damage to the annular attachment portion 54 can be accurately suppressed.

Further, in the head protecting airbag device M according to the embodiment, the insertion groove portions 100 and 100, through which the upper portion 58 disposed on the upper side of the opening portion 55 of the annular attachment portion 54 can be inserted, are formed on the front end side and the rear end side of the protective ring portion 90. Therefore, when the upper portion 58 of the annular attachment portion 54 is inserted into the insertion groove portions 100 and 100 formed on the front end side and the rear end side of the protective ring portion 90, as the areas of the corner portions 56b and 56c of the inner peripheral edge 56 of the opening portion 55 are covered by the corner cover portions 97 and 97, the annular attachment portion 54 can be assembled to the protective ring portion 90. As a result, the annular attachment portion 54 can be easily assembled to the protective ring portion 90. In detail, in the head protecting airbag device M according to the embodiment, areas of upper edge sides of the corner portions 56b and 56c of the inner peripheral edge 56 of the opening portion 55 of the annular attachment portion 54 are covered by the corner cover portions 97 and 97, and areas of front edge sides and rear edge sides of the corner portions 56b and 56c are covered by the end edges 97c (proximity side edge portions 100c close to central sides of the insertion groove portions 100 in the front-rear direction) of the corner cover portions 97 separated from each other in the front-rear direction. Further, in the head protecting airbag device M according to the embodiment, in the protective ring portion 90, the upper wall portion 95, which is an area between the insertion groove portions 100 and 100, is configured to cover the intra-vehicle side of the upper portion 58 as an intra-vehicle cover portion. In other words, in the head protecting airbag device M according to the embodiment, in a state in which the annular attachment portion 54 overlaps with the intra-vehicle side of the protective ring portion 90, the upper portion 58 is inserted into the insertion groove portions 100 and 100 and is disposed on the extra-vehicle side of the upper wall portion 95, so that the annular attachment portion 54 is locked to the protective ring portion 90. Therefore, for example, as compared to a case where an opening through which the annular attachment portion is inserted is formed in an area on the extra-vehicle side of the protective ring portion of the case body, the annular attachment portion protruding from the opening is disposed such that a portion thereof on a base portion side covers the extra-vehicle side of the protective ring portion, and the extra-vehicle side of the upper wall portion is covered by the upper portion on a tip end side, the annular attachment portion can be easily assembled to the protective ring portion. When this point is not considered, the case may be configured to cover the extra-vehicle side of the protective ring portion by the base portion side of the annular attachment portion.

Further, in the head protecting airbag device M according to the embodiment, the case 65 includes a locking claw portion for preventing extraction of the upper portion 58 in a state of being inserted into the insertion groove portions 100. The case 65 includes the lateral locking claw portion 102 that is formed in an edge portion (the separation side edge portion 100b) on a side separated from the upper wall portion 95 as the intra-vehicle side cover portion in the insertion groove portions 100 and can press the extra-vehicle side of the upper portion 58 at a time of the insertion and the upper locking claw portion 103 that is formed at a position above the insertion groove portions 100 and can lock the upper side of the upper portion 58 at a time of the insertion. Therefore, the lateral locking claw portion 102 can regulate large separation of the upper portion 58 inserted into the insertion groove portions 100 from the upper wall portion 95 as the intra-vehicle side cover portion to the extra-vehicle side. Further, the upper locking claw portion 103 can regulate upward movement of the upper portion 58 inserted into the insertion groove portions 100 such that the upper portion 58 is extracted from the insertion groove portions 100. As a result, a state in which the upper portion 58 is inserted into the insertion groove portions 100 can be stably maintained. For example, when the airbag assembly is transported in a state in which the completely folded body 62 is accommodated in the case 65, and the like, the annular attachment portion 54 can be accurately prevented from being extracted from the insertion groove portions 100, and handling workability of the airbag assembly is improved. In particular, in the head protecting airbag device M according to the embodiment, the case 65R itself is bendable at a portion of the connection belt 87 that connects the protective ring portion 90 and the attachment seat portion 85. However, when the airbag assembly is transported, and the like, even if the completely folded body 62 is bent at this portion, a state in which the annular attachment portion 54 is locked to the protective ring portion 90 can be stably maintained. When such a point is not considered, a configuration in which the locking claw portion as the case is not disposed may be used.

Furthermore, in the head protecting airbag device M according to the embodiment, the guide wall portions 93c and 94c, of which tip ends are formed to be inclined toward an upper side of the extra-vehicle side and which serve as guides when the upper portion 58 is inserted into the insertion groove portions 100, are disposed on the upper end 93a and 94a sides of the front wall portion 93 and the rear wall portion 94, which are front and rear opposite sides of the upper wall portion 95 as the intra-vehicle side cover portion. Therefore, when the annular attachment portion 54 is attached to the protective ring portion 90 to overlap the intra-vehicle side, after the upper portion 58 overstrides the upper cover portion 99 formed on the upper edge side of the upper wall portion 95 as the intra-vehicle side cover portion, the upper portion 58 can be smoothly inserted into the insertion groove portions 100 and 100 along the guide wall portions 93c and 94c disposed on the front and rear opposite sides, and an insertion operation when the upper portion 58 is inserted into the insertion groove portions 100 is easy. When such a point is not considered, the guide wall portions may not be provided on front and rear opposite sides of the intra-vehicle side cover portion.

In the embodiment, although the assist grip 7 as an internal component is mounted on the vehicle, the internal component is not limited to the assist grip, and may be, for example, an indoor lamp or the like.

What is claimed is:

1. A head protecting airbag device mounted on a vehicle in which an internal component is disposed on an upper edge side of a window, the device comprising:
    an airbag which is configured to cover the window of the vehicle when being unfolded and inflated and is folded and stored on the upper edge side of the window on an intra-vehicle side and in which the upper edge side when the airbag is completely inflated is attached to a body side of the vehicle at a plurality of points along a front-rear direction; and
    a synthetic resin case in which a completely folded body of the airbag is folded such that a lower edge side approaches the upper edge side when the airbag is completely inflated is accommodated, wherein
    the internal component is disposed near an upper side of the accommodation portion for the airbag, and a fixed portion is fixed to a metal bracket attached to the body side and protruding in a substantially square pole shape toward the intra-vehicle side and is thus attached to the body side,
    the airbag is configured such that an annular attachment portion having an opening portion which is open in a substantially square shape so as to insert the bracket therethrough is disposed at a position corresponding to the fixed portion on the upper edge side when the airbag is completely inflated,
    the case includes a protective ring portion having an opening through which the bracket is inserted, and attached to the body side together with the annular attachment portion while protecting the annular attachment portion, and
    the protective ring portion includes a corner cover portion that covers areas of front and rear corner portions on the upper edge side in an inner peripheral edge of the opening portion and is configured to prevent contact with front and rear corner portions on an upper surface side of the bracket, wherein
    a front end side and a rear end side of the protective ring portion are cut away from the upper edge side to provide insertion groove portions through which an upper portion disposed on an upper side of the opening portion of the annular attachment portion is inserted, and an area between the insertion groove portions is configured as an intra-vehicle side cover portion that covers an intra-vehicle side of the upper portion when the airbag is mounted on the vehicle, and
    the corner cover portion is configured with a portion protruding from a lower edge side of the intra-vehicle side cover portion toward an extra-vehicle side.

2. The head protecting airbag device according to claim 1, wherein
    the case includes a locking claw portion for preventing extraction of the upper portion in a state of being inserted into the insertion groove portions, and
    a lateral locking claw portion which is formed in an edge portion on a side separated from the intra-vehicle side cover portion in the insertion groove portions and is configured to press an extra-vehicle side of the upper portion after the insertion and an upper locking claw portion which is formed at a position above the insertion groove portions and is configured to lock an upper side of the upper portion after the insertion are disposed as the locking claw portion.

3. The head protecting airbag device according to claim 1, wherein
    guide wall portions, of which tip ends are formed to be inclined toward an upper side of an extra-vehicle side and which serve as guides when the upper portion is inserted into the insertion groove portions, are formed in areas which are front and rear opposite sides of the intra-vehicle side cover portion.

4. The head protecting airbag device according to claim 1, wherein
    the internal component is an assist grip.

5. The head protecting airbag device according to claim 1, wherein
    the protective ring portion includes a protrusion portion which surrounds an outer peripheral side of the opening along an entire periphery and protrudes toward the intra-vehicle side, and
    the protrusion portion is disposed to cover an inner peripheral side of the opening portion.

6. The head protecting airbag device according to claim 1, wherein
    an upper cover portion that covers an upper side of the upper portion is formed on an upper edge side of the intra-vehicle side cover portion to protrude toward the extra-vehicle side.

7. The head protecting airbag device according to claim 6, wherein
    guide wall portions, of which tip ends are formed to be inclined toward an upper side of an extra-vehicle side and which serve as guides when the upper portion is inserted into the insertion groove portions, are formed in areas which are front and rear opposite sides of the intra-vehicle side cover portion, and
    the guide wall portions are formed at positions below the upper cover portion.

* * * * *